United States Patent [19]

Teshima

[11] Patent Number: 5,573,272
[45] Date of Patent: Nov. 12, 1996

[54] VEHICLE UPHOLSTERY MEMBER

[75] Inventor: Kouya Teshima, Aichi, Japan

[73] Assignee: Inoac Corporation, Nagoya, Japan

[21] Appl. No.: 521,574

[22] Filed: Aug. 30, 1995

[30] Foreign Application Priority Data

Aug. 30, 1994  [JP]  Japan ................................. 6-230774

[51] Int. Cl.$^6$ ................................................. B60R 21/04
[52] U.S. Cl. .................... 280/751; 296/146.6; 296/146.7
[58] Field of Search .................................... 280/751, 748,
280/752; 296/146.6, 146.7, 153

[56] References Cited

U.S. PATENT DOCUMENTS

| | | | |
|---|---|---|---|
| 3,224,924 | 12/1965 | Ardenne et al. | 280/751 X |
| 4,890,877 | 1/1990 | Ashtiani-Zarandi et al. | 296/153 X |
| 5,306,066 | 4/1994 | Saathoff | 296/146.6 |
| 5,356,177 | 10/1994 | Weller | 280/751 |
| 5,433,478 | 7/1995 | Narase | 280/751 |
| 5,445,430 | 8/1995 | Nichols | 296/153 |

FOREIGN PATENT DOCUMENTS

| | | | |
|---|---|---|---|
| 2524633 | 6/1975 | Germany | 280/751 |
| 0029459 | 2/1987 | Japan | 280/751 |
| 4-293640 | 10/1992 | Japan . | |
| 5-514 | 1/1993 | Japan . | |

*Primary Examiner*—Christopher P. Ellis
*Attorney, Agent, or Firm*—Sughrue, Mion, Zinn, Macpeak & Seas

[57] ABSTRACT

A vehicle upholstery member includes an outer shell being placed from a placement part on an indoor side of a vehicle door toward the indoor side and a lattice-shaped rib structure consisting of a plurality of rib pieces, along a vehicle width direction crossing each other appropriately at least at a place corresponding to passenger hips in a space sandwiched between the outer shell and the placement part. A lateral width and a longitudinal width of each of lattice cells making up the rib structure substantially crossing at right angles to the vehicle width direction are set to 20–180 mm, respectively, a thickness of each of the rib pieces is set to 0.5–3 mm, and a value resulting from dividing a product of the lateral width and the longitudinal width by the thickness is set to 750–3600 mm.

14 Claims, 8 Drawing Sheets

VEHICLE UPHOLSTERY MEMBER

BACKGROUND OF THE INVENTION

1. Field of the Invention

This invention relates to a vehicle upholstery member (hereinafter referred to as "upholstery member") and more particularly to an upholstery member which is capable of exactly protecting passengers (particularly, their hips and waists) in the event of a vehicle collision and which can be manufactured at low costs.

2. Description of the Related Art

Figure 9:
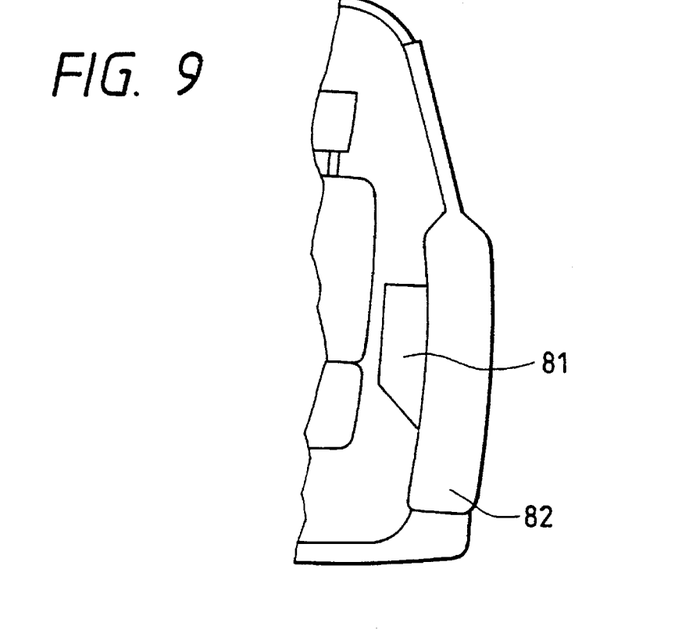
FIG. 9 is a schematic drawing of a vehicle inside.

In recent years, high safety from not only a head-on collision, but also a side collision has been demanded for vehicles. An attempt is made to provide a sufficient shock absorption capability for upholstery members against which passenger's hips or waists directly strike at a side collision, such as an armrest 81 and a door panel 82 shown in FIG. 9.

Figure 10A:
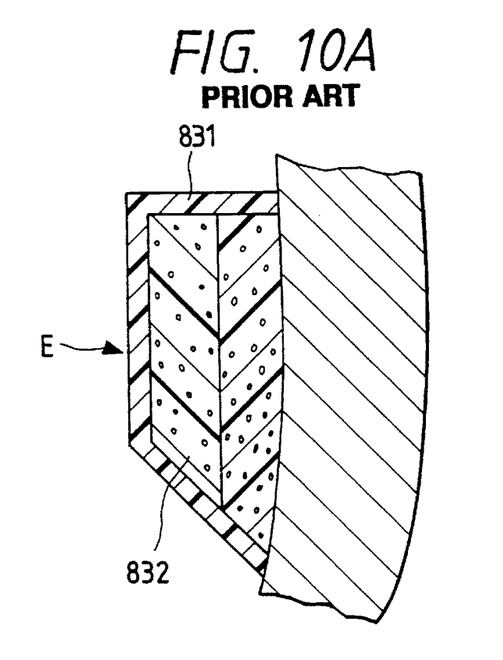
FIGS. 10A and 10B are longitudinal sectional views of upholstery members according to conventional examples.
Figure 10B:
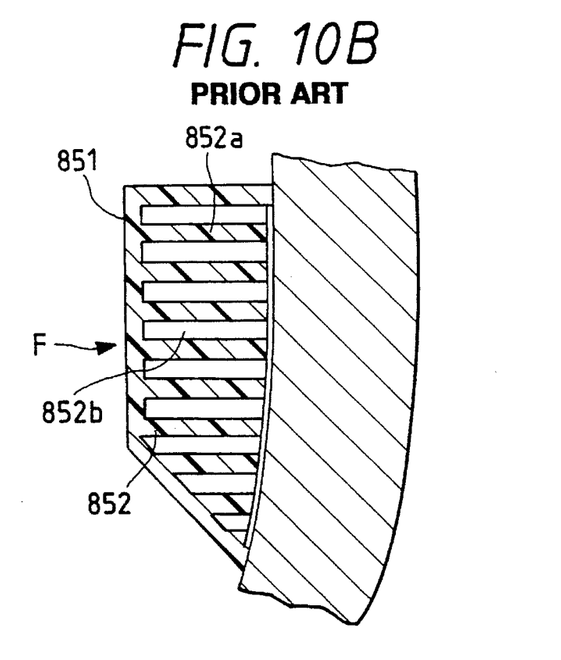

For example, as shown in FIG. 10A, an upholstery member E having a pad layer 832 made of a resin foam substance placed on the rear of an outer shell 831 has been proposed in Japanese Utility Model Unexamined Publication Nos. Hei 4-293640 and Hei 5-514. As shown in FIG. 10B, an upholstery member F having a lattice-shaped rib structure 852 placed on the rear of an outer shell 851 has also been used widely.

However, in the former, the upholstery member E is manufactured through various steps such as preliminary forming of the outer shell 831 and foam formation of the pad layer 832, thus has a long manufacturing cycle and is low in productivity and high in manufacturing costs.

On the other hand, for the upholstery member F in the latter, the outer shell 851 and the rib structure 852 can be molded integrally; even if they are manufactured as separate pieces, and they can be assembled comparatively easily. Therefore, the upholstery member F of this kind can be manufactured efficiently and at low costs.

However, in the conventional upholstery member F, the layout, dimensions, thickness, and total balance of the rib pieces 852a and 852b are not necessarily appropriate, thus often the upholstery member F does not provide adequate shock absorption. For example, in the case where the rib pieces 852a are in a state in which they cannot sufficiently buckle, a shock force cannot sufficiently be absorbed and often is transmitted to passengers. In contrast, in the case where the rib pieces 852a are in a state in which they buckle too easily, often deformation develops momentarily and is completed before the shock force can sufficiently be absorbed.

Often the structure of a vehicle door of a car varies depending greatly on the type of car, such as popular, high-grade, lightweight, or large car. Thus, the shock absorption capability of the vehicle door at a side collision also varies from one car to another and the shock force that the upholstery members undergo also vary. Therefore, the advent of upholstery members capable of exactly absorbing a shock force in a wide range of cars has been desired.

SUMMARY OF THE INVENTION

The present invention has been made in view of the above, and therefore an object of the invention is to provide an upholstery member which is capable of effectively protecting passengers and being manufactured at low costs.

According to one aspect of the invention, there is provided an upholstery member comprising an outer shell being placed from a placement part on an indoor side of a vehicle door toward the indoor side and a lattice-shaped rib structure consisting of rib pieces along a vehicle width direction crossing each other appropriately at least at a place corresponding to passenger hips in a space sandwiched between the outer shell and the placement part, wherein a lateral width and a longitudinal width of each of lattice cells making up the rib structure substantially orthogonal to the vehicle width direction are set to 20–180 mm, a thickness of each of the rib pieces is set to 0.5–3 mm, and a value resulting from dividing a product of the lateral width and the longitudinal width by the thickness is set to 750–3600 mm.

Also, the depth of each lattice cell along the vehicle width direction (hereinafter referred to as "rib depth") may be preferably set to 30–100 mm.

Further, the rib pieces may be made of a resin material having a bend elastic factor in the range of 7000–32000 kgf/cm$^2$.

According to another aspect of the invention, there is provided a vehicle upholstery member comprising an outer shell being placed from a placement part on an indoor side of a vehicle door toward the indoor side and a lattice-shaped rib structure including rib pieces along a vehicle width direction crossing each other appropriately at least at a place corresponding to passenger hips in a space sandwiched between the outer shell and the placement part, wherein a lateral width and a longitudinal width of each of lattice cells making up the rib structure substantially orthogonal to the vehicle width direction are set to 20–180 mm, a thickness of each of the rib pieces is set to 0.5–3 mm, a product of the lateral width and the longitudinal width is set to 600–10800 mm$^2$, and a stress produced at 50% deformation in a vehicle width direction of the rib structure caused by a compression force along the vehicle width direction is set to 3–10 kgf/cm$^2$.

In the present invention, with the upholstery member having the outer shell and the lattice-shaped rib structure placed in a space on the rear of the outer shell, a shock force at a collision is absorbed by buckling the rib pieces making up the rib structure.

Also, in the present invention, the lateral width (A) and the longitudinal width (B) of each of the lattice cells forming the rib structure and the thickness (T) of each rib piece are regulated. In addition, the value (K) resulting from dividing the product of the lateral width (A) and the longitudinal width (B) by the thickness (T) is regulated to a given range.

As a result, the spacing and thickness of each rib piece and the size of each lattice cell are accurate and these numeric values are well balanced. Therefore, the rib structure does not come into a state in which it becomes extremely hard to buckle (hereinafter referred to as "overstable state") or a state in which it buckles extremely easily (hereinafter referred to as "unstable state"). Sufficient critical load at a collision (hereinafter referred to as "initial load") is exhibited and the rib pieces absorb a shock force sufficiently while buckling at an appropriate deformation speed. The upholstery member of the present invention can protect passengers reliably from a shock caused by a side collision. Thus, the invention can provide an upholstery member securely having high shock absorption performance by objective and simple means of regulating the numeric values.

The upholstery member of the invention includes the well balanced rib structure and is excellent in shock absorption capability, thus can exactly cope with a wide range of a shock force.

DETAILED DESCRIPTION OF THE PREFERRED EMBODIMENTS

Referring now to the accompanying drawings, a description will be given of preferred embodiments of the invention.

Figure 1:
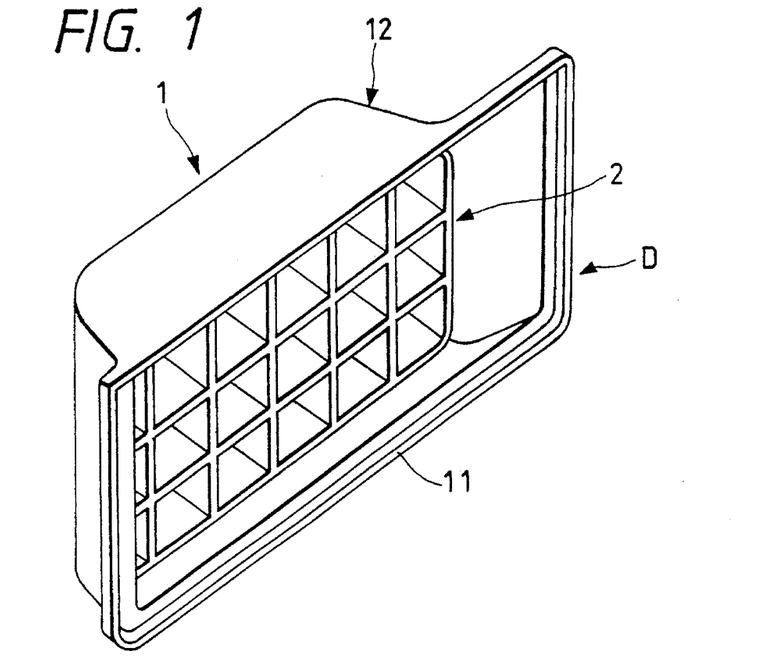
FIG. 1 is a perspective view of a door panel according to a first embodiment of the invention.
Figure 2:
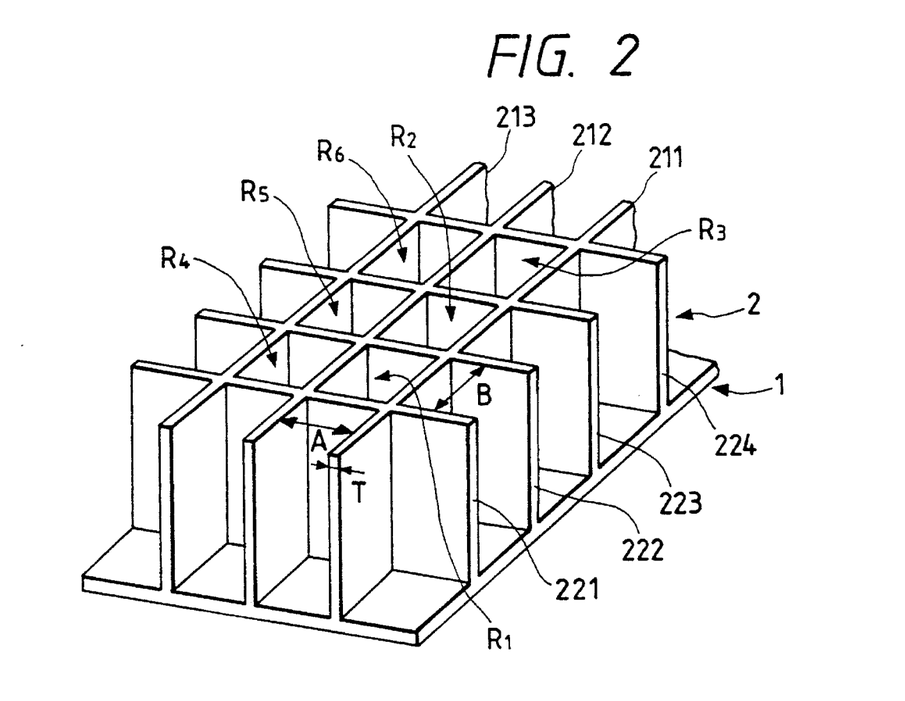
FIG. 2 is a partially perspective view explaining a rib structure of the first embodiment.
Figure 3:
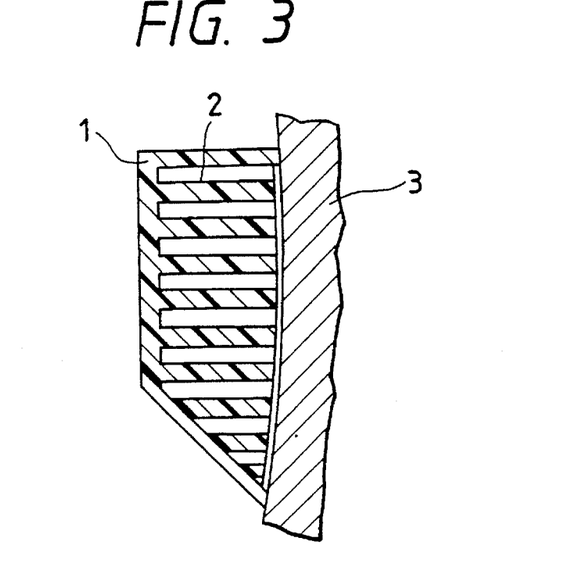
FIG. 3 is a longitudinal sectional view of the door panel of the first embodiment.

In a first embodiment, an upholstery member (specimen) as shown in FIGS. 1–3 is manufactured. This specimen is a door panel D mounted on the indoor side of a vehicle door 3 and is comprised of an outer shell 1 and a rib structure 2.

Figure 4A:
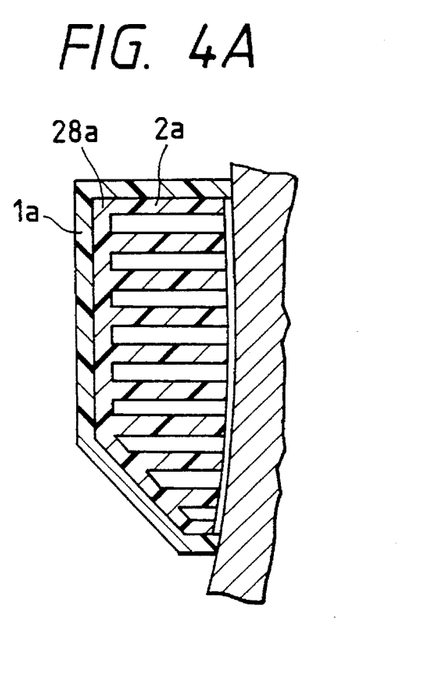
FIGS. 4A and 4B are longitudinal sectional views of the door panel according to modifications of the first embodiment.
Figure 4B:
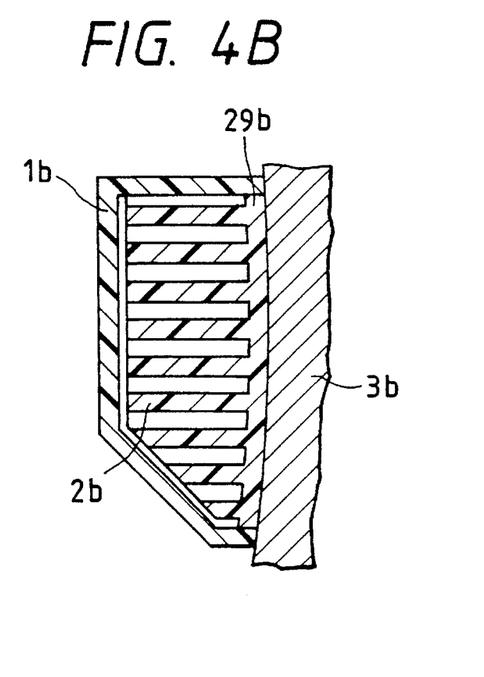

The outer shell 1 and the rib structure 2 are comprised of an integrally molded article manufactured by injection molding with a resin material such as polypropylene. However, they can also be manufactured as separate pieces, as shown in FIGS. 4A and 4B. In this case, as shown in FIG. 4A, a rib structure 2a may be attached to an outer shell 1a before they are mounted on the indoor side. Alternatively, as shown in FIG. 4B, a rib structure 2b may be attached to the indoor side before an outer shell 1b is put thereon. Further, in the latter case, the rib structure 2b may be integral with the attachment part of a vehicle door 3b.

The outer shell 1 defines the form of the door panel D as shown in FIG. 1, and has an outer form substantially like a box. An edge 11 of the outer shell 1 is attached to a placement part of the vehicle door and the outer shell 1 is placed in a state in which it swells to the indoor side of the vehicle. To integrally build operation switches of a power window and a door pocket in the door panel D, recesses and holes for fitting them can also be formed at predetermined parts of the outer shell 1.

The rib structure 2 is placed along the vehicle width direction from the rear side of the design face of the outer shell 1. In FIG. 4A, an auxiliary plate 28a (about 2.5 mm in mean thickness) of an outer form substantially corresponding to the design face of the outer shell 1a is placed on the inside of the outer shell 1a. The rib structure 2a is extended to the back side of the outer shell along the vehicle width direction. In FIG. 4B, an auxiliary plate 29b (about 2.5 mm in mean thickness) substantially corresponding to the attachment part of the vehicle door 3b is placed, and the rib structure 2b is extended from the auxiliary plate 29b along the vehicle width direction.

As shown in FIGS. 1 and 2, the rib structure 2 is shaped like a lattice consisting of longitudinal rib pieces 211–213 along the length of the outer shell 1 and lateral rib pieces 221–224 aligned in a lateral direction. The rib pieces crossing each other, such as 211 and 221, are integral with each other at the cross point. It should be noted that the rib structure 2 need not necessarily be placed on the entire rear face of the outer shell 1 and may be placed only at a position abutting passenger's hips or waist at a collision. Places where rib pieces 211 and 221 are removed may exist for placing the switches and a door pocket.

The rib structure 2 has a structure of a matrix of lattice cells R1–R6. Each of the lattice cells R1–R6 is substantially like a pipe having parts of the four rib pieces, such as 211, 212, 221, and 222, as side walls. Further, each lattice cell like R1 shares side walls with other contiguous lattice cells R2 and R4. In the embodiment, the lattice cells R1–R6 are of substantially the same form and size, but lattice cells different in form or size may be mixed in relation to the forms of the outer shell 1 or the switches. The lattice cells placed on the peripheral edge of the auxiliary plate 28 may be formed with the inner wall of the outer shell 1 as one side wall.

In this embodiment, 24 types of such specimen were manufactured as listed in Tables 1 and 2.

TABLE 1

| Specimen No. | Lateral width A (mm) | Longitudinal width B (mm) | Product M (mm$^2$) | Thichness T (mm) | Value K (mm) | Produced stress (kgf/cm$^2$) |
| --- | --- | --- | --- | --- | --- | --- |
| 1 | *10 | 120 | 1200 | 0.8 | 1500 | 3.4 |
| 2 | 20 | 20 | *400 | 0.8 | *500 | *13.9 |
| 3 | 20 | 30 | 600 | 0.8 | 750 | 9.7 |
| 4 | 20 | 40 | 800 | 0.8 | 1000 | 7.6 |
| 5 | 20 | 60 | 1200 | 0.8 | 1500 | 5.5 |
| 6 | 20 | 120 | 2400 | 0.8 | 3000 | 3.4 |
| 7 | 20 | 150 | 3000 | 0.8 | *3750 | *2.7 |
| 8 | 30 | 30 | 900 | 0.8 | 1125 | 6.8 |
| 9 | 30 | 40 | 1200 | 0.8 | 1500 | 5.2 |
| 10 | 30 | 60 | 1800 | 0.8 | 2250 | 3.8 |
| 11 | 30 | 120 | 3600 | 0.8 | *4500 | *2.3 |
| 12 | 40 | 40 | 1600 | 0.8 | 2000 | 4.1 |

TABLE 2

| Specimen No. | Lateral width A (mm) | Longitudinal width B (mm) | Product M (mm$^2$) | Thickness T (mm) | Value K (mm) | Produced stress (kgf/cm$^2$) |
| --- | --- | --- | --- | --- | --- | --- |
| 13 | 40  | 60  | 2400   | 0.8 | 3000  | 3.0  |
| 14 | 60  | 60  | 3600   | 0.8 | *4500 | *2.1 |
| 15 | 20  | 20  | *400   | 0.5 | 800   | 11.6 |
| 16 | 20  | 30  | 600    | 0.5 | 1200  | 8.1  |
| 17 | 20  | 120 | 2400   | 0.5 | *4800 | *2.8 |
| 18 | 20  | 40  | 800    | 0.5 | 1600  | 6.3  |
| 19 | 20  | 60  | 1200   | 0.5 | 2400  | 4.6  |
| 20 | 30  | 60  | 1800   | 0.5 | 3600  | 3.2  |
| 21 | 60  | 180 | 10800  | 3.0 | 3600  | 3.0  |
| 22 | 120 | 120 | *14400 | 3.0 | *4800 | *2.5 |
| 23 | 60  | 120 | 7200   | 3.0 | 2400  | 4.5  |
| 24 | 60  | 60  | 3600   | 3.0 | 1200  | 7.5  |

These specimens (Nos. 1–24) differ in lateral width (A) or longitudinal width (B) of lattice cells R1, or thickness (T) of rib pieces 211 and 221. However, the specimens have the same rib depth 60 mm and the bend elastic factor of the rib structure made from polypropylene is 14,500 kgf/cm$^2$.

The "50% produced stress" is stress produced when a compression force is applied to a predetermined test piece along the vehicle width direction and the test piece is displaced 50% along the compression force input direction. This 50% produced stress of each specimen was measured with a static compression test, that is, non-impact test wherein each test piece has 120×60 mm area . . . involving each predetermined value of the lateral width (A), longitudinal width (B), thickness (C) and rib depths. Specifically, each test piece was compressed in a condition in which the deformation speed becomes 50 mm/min along the vehicle width direction.

If the "produced stress at 50% deformation" thus found is in the preferred range (3–10 kgf/cm$^2$), it is considered that the rib structure 2, in turn, the door panel D has a sufficient shock absorption capability and that this tendency can also be maintained reliably for a wide range of a shock force.

Figure 5:
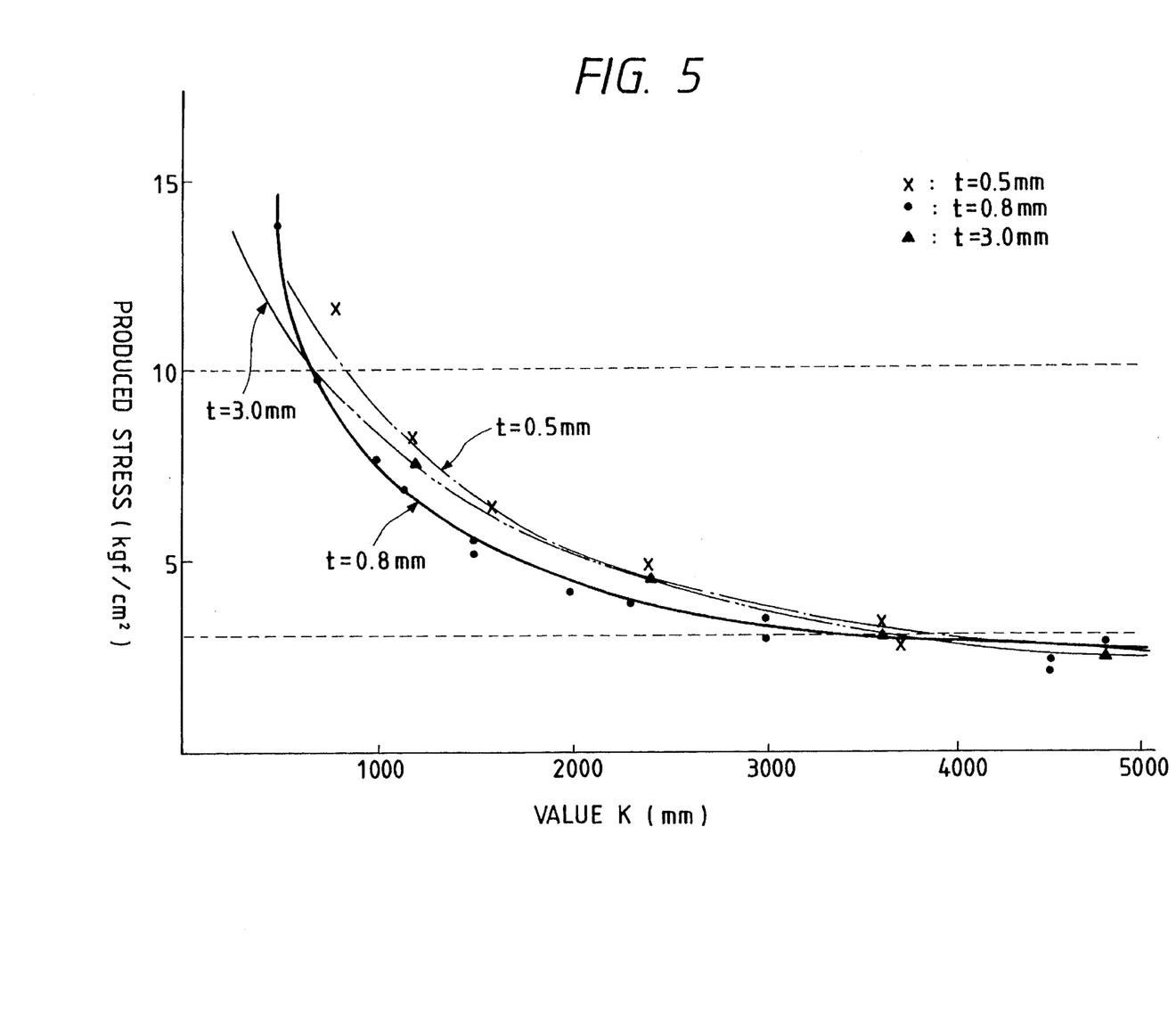
FIG. 5 is a graph showing the relationship between value (K) and 50% produced stress in the first embodiment.

The measurement results are also listed in Tables 1 and 2. FIG. 5 is a graph showing the relationship between the value (K) resulting from dividing the product (M) of the lateral width (A) and the longitudinal width (B) by the thickness (T) and the 50% produced stress at each specimen.

According to the results, if the lateral width (A) and the longitudinal width (B) are set to 20–180 mm and the thickness (T) is set to 0.5–3 mm and the value (K) lies in the range of 750–3600 mm, it is found that 50% produced stress falls in the range of 3–10 kgf/cm$^2$.

Next, a sample (120 mm×120 mm×60 mm) containing the rib pieces 211 and 221 was isolated from the door panel D of specimen No. 8. Three similar samples were provided as the specimen.

Figure 6:
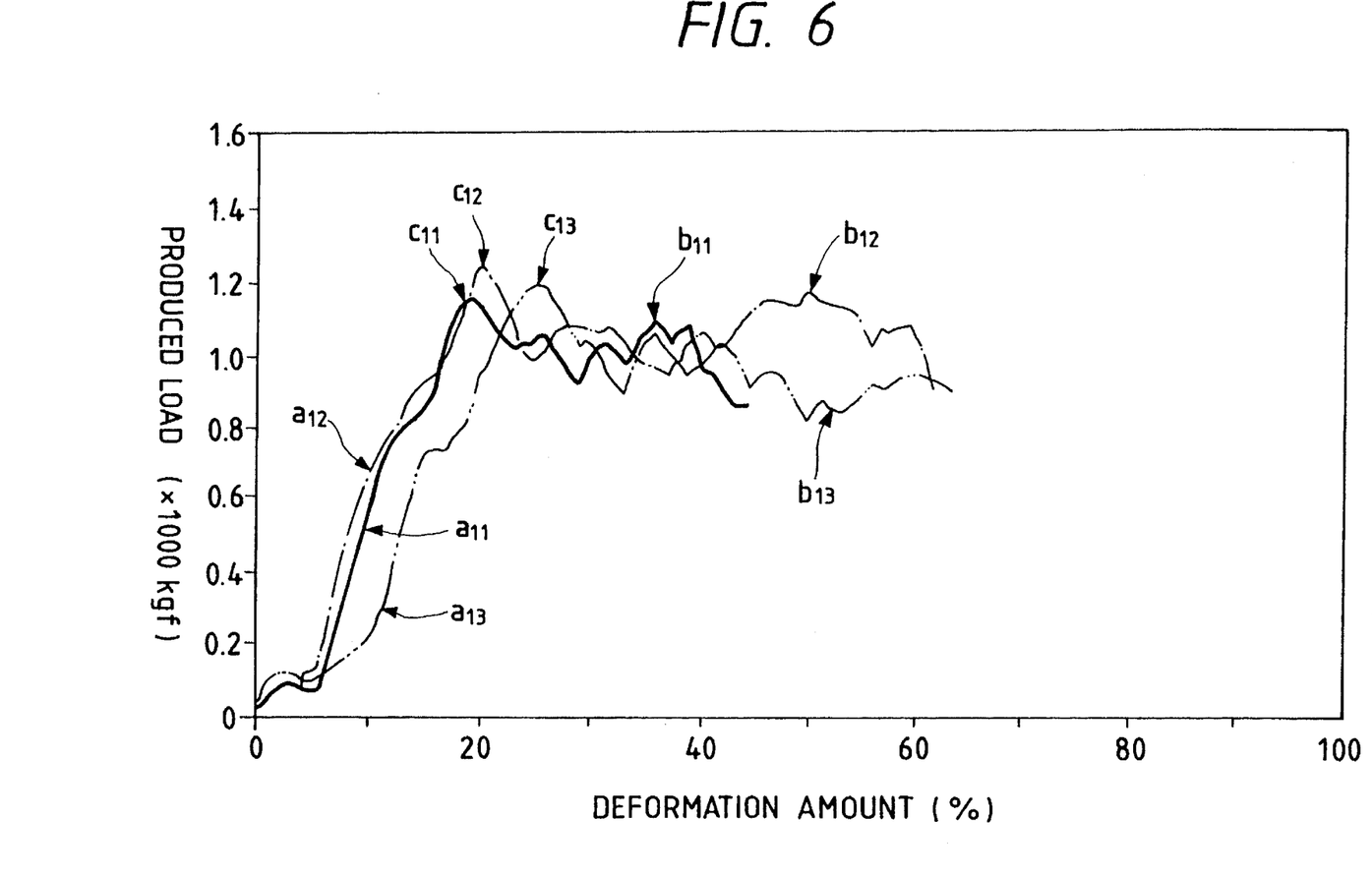
FIG. 6 is a graph showing shock test results in the first embodiment.

A shock absorption test causing a 20.6-kg collider to collide at the collision speed 6 m/s was executed. FIG. 6 shows a shock load-displacement curve obtained at that time.

As shown in the figure, the shock load-displacement curve exhibits parts b11, b12, and b13 substantially constant in load following initial rising parts a11, a12, and a13. Initial loads c11, c12, and c13 have a reasonable magnitude and are not too high. That is, it is close to an ideal shock load-displacement curve. Therefore, it is seen that the specimen does not transmit a large shock force to passengers at a collision and is high in energy absorption amount.

Thus, the door panel D of the embodiment can efficiently absorb a shock force at a side collision and reliably provide safety for passengers.

Figure 7:
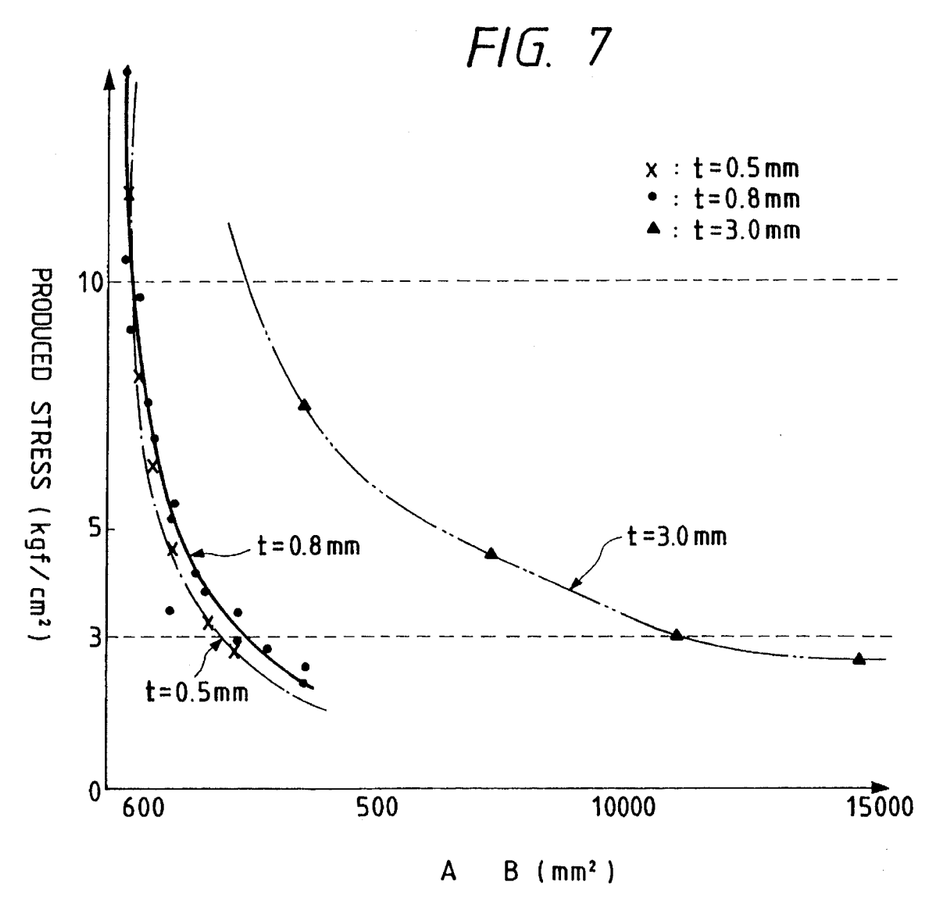
FIG. 7 is a graph showing the relationship between product (M) and 50% produced stress in the first embodiment.

Further, FIG. 7 is a graph showing the relationship between the product (M) and 50% produced stress at each specimen.

From the results, it is seen that when the specimens are 3 mm thick as the thickness (T) (specimen Nos. 1–14), the specimens exhibit good shock absorption performance in the range of 4000–10800 mm$^2$ of the product (M) and that when the specimens are thinner, that is, 0.8 or 0.5 mm thick as the thickness (T) (specimen Nos. 15–24), the specimens display good shock absorption performance in the range of 600–4000 mm$^2$ of the product (M).

Therefore, if the size of the lattice cell R1 becomes large, the thickness of the rib pieces 211 and 221 is increased and if the size becomes small, the thickness is lessened, whereby excellent shock absorption performance can be provided.

Figure 8:
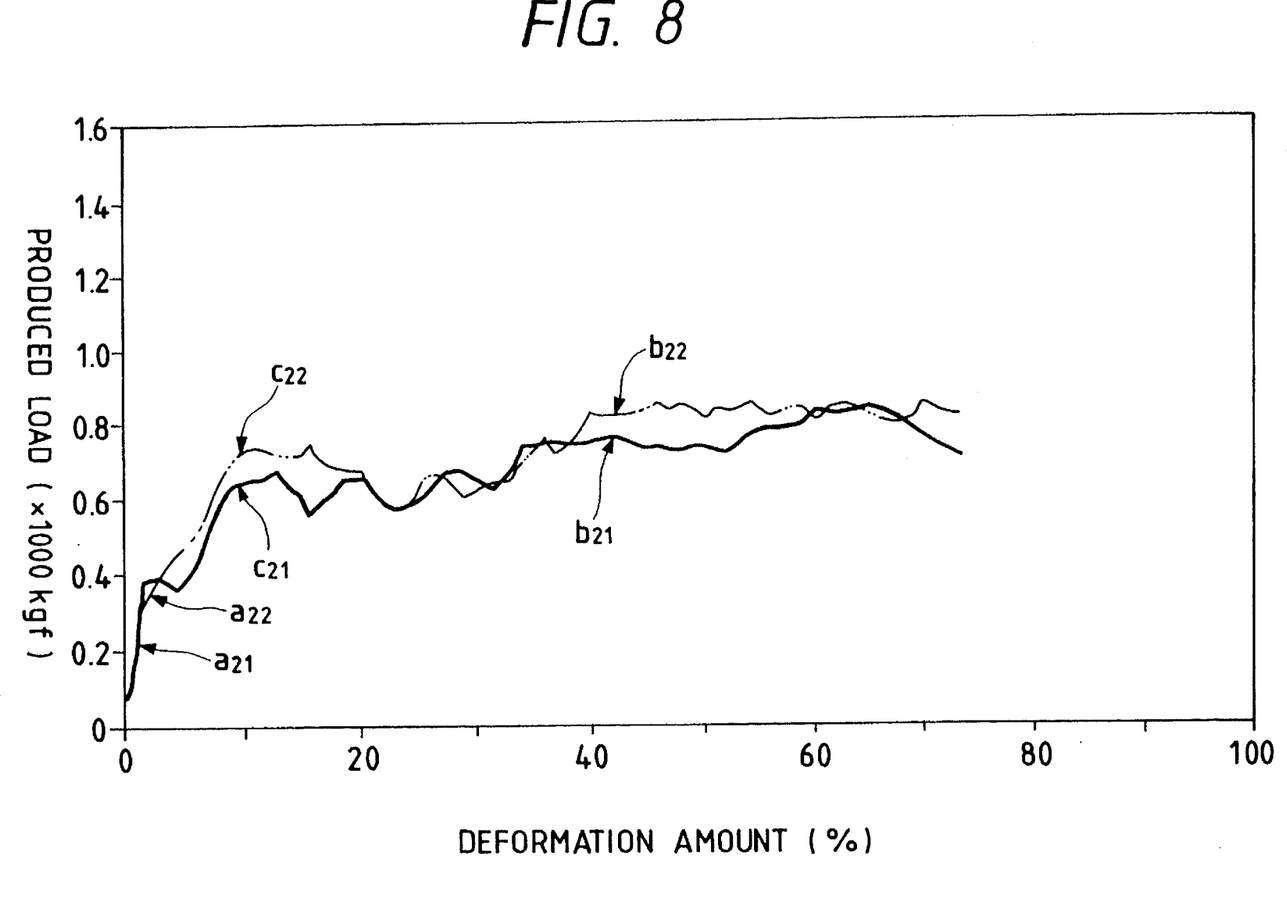
FIG. 8 is a graph showing shock test results in a second embodiment of the invention.

In a second embodiment, a shock absorption test similar to that for the door panel of specimen No. 8 was executed for the door panel of specimen No. 10. That is, a sample (120mm×120 mm×60 mm) containing the rib pieces 211 and 221 was isolated from the door panel of specimen No. 10. Two similar samples were provided as the sample. A collider as in the first embodiment is caused to collide at a collision speed as in the first embodiment for executing the shock absorption test. FIG. 8 shows a shock load-displacement curve obtained at that time.

As shown in the figure, in the second embodiment, the shock load-displacement curve also exhibits parts b21 and b22 substantially constant in load following initial rising parts a21 and a22. Initial loads c21 and c22 have a reasonable magnitude. Therefore, in the second embodiment, it is also close to an ideal shock load-displacement curve.

That is, it is seen that the door panel of specimen No. 10 having the longitudinal width (B) which is made twice the lateral width (A) within the range of 20 to 180 mm can also efficiently absorb a shock force at a side collision and reliably provide safety for passengers.

As described above, in the upholstery member of the invention, a lateral width and a longitudinal width of each of lattice cells making up the rib structure substantially orthogonal to the vehicle width direction are set to 20–180 mm, respectively, a thickness of each of the rib pieces is set to 0.5–3 mm, and a value resulting from dividing a product of the lateral width and the longitudinal width by the thickness is set to 750–3600 mm.

Also, in the vehicle upholstery member of the invention, a lateral width and a longitudinal width of each of lattice cells making up the rib structure substantially orthogonal to the vehicle width direction are each 20–180 mm, a thickness of each of the rib pieces is 0.5–3 mm, a product of the lateral width and the longitudinal width is 600–10800 mm², and a stress produced at 50% deformation in a vehicle width direction of the rib structure caused by a compression force along the vehicle width direction is 3–10 kgf/cm².

The outer shell is placed on the design face of the upholstery member and defines the outer form of the upholstery member. The surface of a door armrest and door trim can be exemplified. The outer shell may be made of any material, such as a resin material of polypropylene or acrylonitrile-butadiene-styrene (ABS).

The rib structure may be integral with or separate from the outer shell. However, if they are formed into one piece, the outer shell and rib pieces (rib structure) can be manufactured at the same time by injection molding, thus manufacturing efficiency can be furthermore improved. If they are separate, the rib structure may be attached to the outer shell before they are mounted on a predetermined placement part, or the rib structure may be mounted on a predetermined placement part before the outer shell is put thereon. Further, the rib structure may be integral with the placement part.

The rib structure may also be made of any material, such as a resin material of polypropylene or acrylonitrile-butadiene-styrene (ABS). However, to accomplish the purpose of the invention more reliably, the bend elastic factor of each rib piece (rib structure) is preferably set to 7000–32000 kgf/cm².

Further, the rib structure need not necessarily be placed on the entire face on the vehicle outer plate side (rear) of the outer shell and may be placed only at a position abutting passenger's hips or waist at a collision.

Another member such as a cushion can also be placed between the rear of the outer shell and the rib structure or between the rib structure and the attachment place integrally with or separately from the rib structure. For example, a predetermined auxiliary plate can be placed at a position between the rib structure to the outer shell. Alternatively, an auxiliary plate can also be placed at a position between the rib structure to the vehicle door.

The lattice cell constitutes a unit forming a part of the rib structure. One lattice cell substantially like a tube made up of four rib pieces crossing each other can be exemplified.

Further, the rib depth is preferably set to 30–100 mm. The rib depth of at least about 30 mm is required for the rib structure to effectively function as a shock absorption structure. On the other hand, if the rib depth exceeds 100 mm, the rib structure comes into the "unstable state", and it is feared that the buckling speed will become excessive.

It should be noted that the size and depth of each lattice cell need not be constant throughout the rib structure. For example, they can also be changed in accordance with the outer form of the upholstery member.

Figure 11:
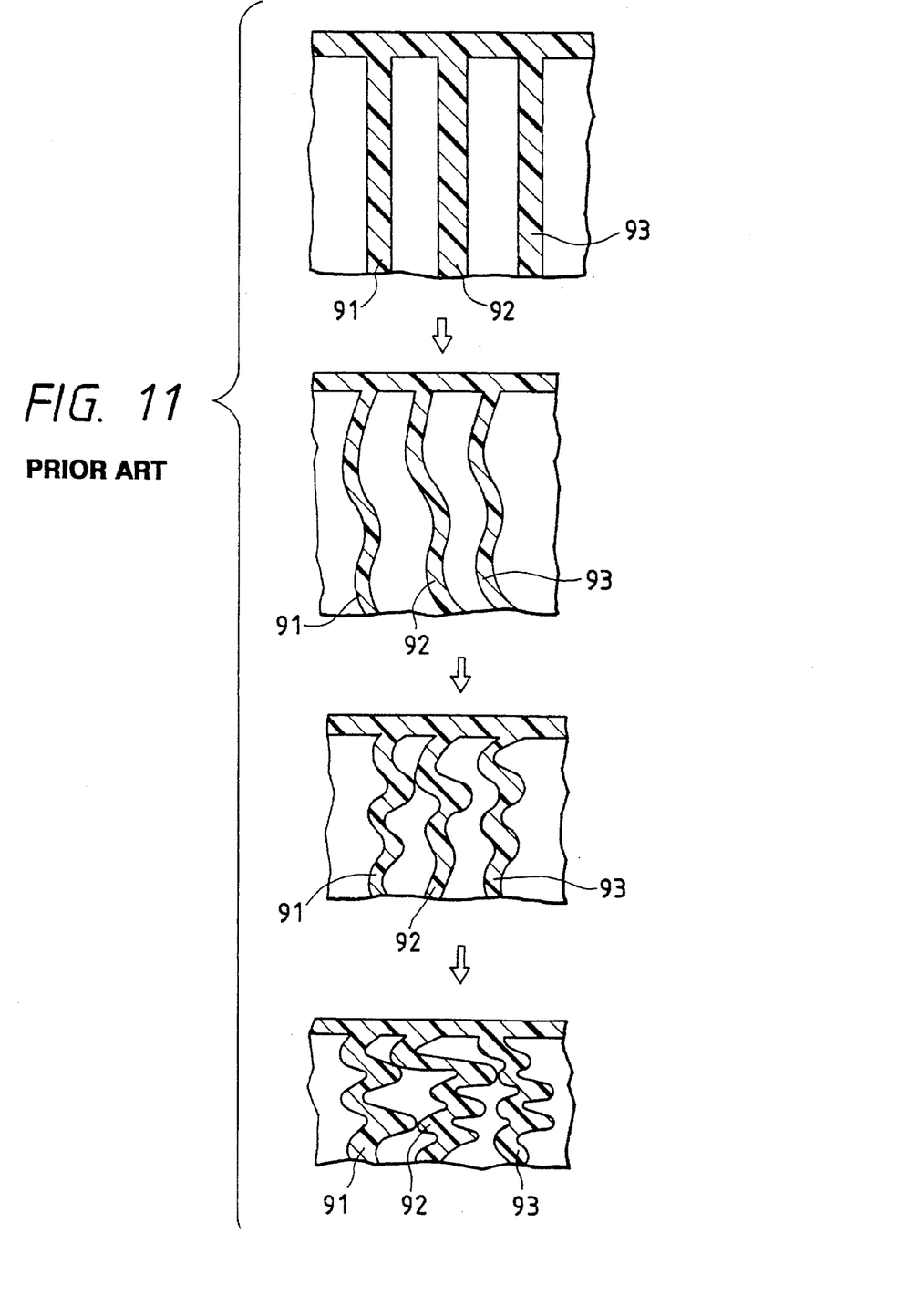
FIG. 11 is an illustration showing a state in which rib pieces buckle improperly.

The main reason why the range of the lateral width (A) and the longitudinal width (B) of each lattice cell is defined as mentioned above is as follows: If one of the lateral width (A) and the longitudinal width (B) is less than 20 mm, a space between two of the contiguous rib pieces 91–93 becomes narrow as shown in FIG. 11, and it is feared that the rib piece 92 will come in contact with the contiguous rib piece 91 or 93, which will interfere with buckling the rib piece 92. On the other hand, if it exceeds 180 mm, it is feared that passenger hips will be caught in one of the lattice cells at a collision, hindering the rib structure from serving as a shock absorption structure.

Further, the main reason why the range of the thickness (T) of each rib piece is defined as mentioned above is as follows: It is technically difficult to make the rib depth sufficient, for example, about 40–80 mm while each rib piece is made less than 0.5 mm thick. On the other hand, if each rib piece is made more than 3 mm thick, unless the lateral width (A) and the longitudinal width (B) are set to more than 180 mm, the rib structure will come into the "overstable state". If the size of the lattice cell becomes thus large, trouble that "passenger hips are caught in one of the lattice cells" will easily occur.

The numeric values are well balanced by regulating the value (K). That is, the ratio between the lateral width (A) and the longitudinal width (B) is exactly regulated according to the value (K). As the size of the lattice cell increases or decreases, the thickness of the rib piece also increases or decreases, preventing the rib structure from coming into the "overstable state" or "unstable state".

In the invention, the lateral width (A), the longitudinal width (B), and the thickness (T) are defined as described above and the value (K) derived from these values is regulated as described above, whereby a sufficient shock absorption capability can be provided for the rib structure, in its turn, the upholstery member.

For example, "produced stress at 50% deformation", that is, "50% produced stress" is available as a numeric value representing the shock absorption capability objectively. The range of the stress needs to be set to 3–10 kgf/cm² to provide a sufficient shock absorption capability for an upholstery member. If the stress exceeds 10 kgf/cm², the "initial load" becomes excessive, transmitting a large shock force to passengers. If the stress is less than 3 kgf/cm², a substantially constant deformation factor is always indicated at a low level for shock, providing insufficient shock absorption, transmitting a large shock force to passengers. In contrast, if the stress ranges from 3 to 10 kgf/cm², the initial load becomes moderate. The rib pieces complete buckling while absorbing a shock force sufficiently at a moderate deformation speed. In addition, this tendency can also be maintained reliably for a wide range of a shock force.

As described above, the upholstery member can reliably absorb a shock force at a side collision. Therefore, it can effectively provide safety for passengers securely. Since objective and simple means of regulating the numeric values of the lateral width and thickness needs only to be provided, the upholstery member can be manufactured efficiently and at low costs while has high performance securely. Further, the outer shell and the rib structure can be formed in one piece by injection molding, in which case the upholstery member can be manufactured furthermore efficiently.

As this invention may be embodied in several forms without departing from the spring of essential characteristics thereof, the embodiments discussed above are therefore illustrative and not restrictive. That is, although we have discussed the door panels in the embodiments, the invention can also be applied to other upholstery members such as armrests. The rib structure according to the embodiment can also be provided separately from conventional upholstery members as a new upholstery member for shock absorption and can be compatible with indoor structures of a wide variety of vehicles.

What is claimed is:

1. A vehicle upholstery member mounted on an indoor side of a vehicle door, comprising:

an outer shell attached to said indoor side of said vehicle door, said outer shell extending into said vehicle;

a shock absorber disposed in at least one part of said outer shell, said shock absorber having a plurality of ribs which are substantially orthogonal to said vehicle door and which form a plurality of substantially rectangular lattices;

wherein each of said lattices has two sides each of which is 20–180 mm in length, and each of said ribs is 0.5–3 mm in thickness.

2. A vehicle upholstery member mounted on an indoor side of a vehicle door, comprising:

an outer shell attached to said indoor side of said vehicle door, said outer shell extending into said vehicle;

a shock absorber disposed in at least one part of said outer shell, said shock absorber having a plurality of ribs which are substantially orthogonal to said vehicle door and which form a plurality of substantially rectangular lattices;

wherein a value resulting from dividing a product of two sides of each of said lattices by a thickness of said ribs is set to 750–3600 mm.

3. A vehicle upholstery member, comprising:

an outer shell attached to an indoor side of a vehicle door, said outer shell extending into said vehicle; and a lattice-shaped rib structure having rib pieces extending along a vehicle width direction and a vehicle length direction such that said rib pieces cross each other appropriately to form lattice cells, wherein said rib structure is placed at least at a place corresponding to passenger hips in a space sandwiched between said outer shell and said vehicle door, wherein a lateral width and a longitudinal width of each of said lattice cells making up said rib structure are set to 20–180 mm, a thickness of each of the rib pieces is set to 0.5–3 mm, and a value resulting from dividing a product of the lateral width and the longitudinal width by a thickness of the rib pieces is set to 750–3600 mm.

4. A vehicle upholstery member mounted on an indoor side of a vehicle door, comprising:

an outer shell attached to said indoor side of said vehicle door, said outer shell extending into said vehicle;

a shock absorber disposed in at least one part of said outer shell, said shock absorber having a plurality of ribs which are substantially orthogonal to said vehicle door and which form a plurality of substantially rectangular lattices;

wherein each of said lattices has two sides each of which is 20–180 mm in length, each of said ribs is 0.5–3 mm in thickness, and a height of said ribs is at least 30 mm.

5. A vehicle upholstery member as claimed in claim 4, wherein the height of said ribs is set to 30–100 mm.

6. A vehicle upholstery member as claimed in claim 5, wherein said shock absorber is made of a resin material having a bend elastic factor which is 7000–32000 kgf/cm$^2$.

7. A vehicle upholstery member as claimed in claim 6, wherein said shock absorber is made of a polypropylene resin having a bend elastic factor which is 7000–32000 kgf/cm$^2$.

8. A vehicle upholstery member as claimed in claim 2, wherein a height of said ribs is set to 30–100 mm.

9. A vehicle upholstery member as claimed in claim 2, wherein a height of said ribs is set to at least 30 mm, and said shock absorber is made of a resin material a bend elastic factor of which is 7000–32000 kgf/cm$^2$.

10. A vehicle upholstery member as claimed in claim 9, wherein said shock absorber is made of polypropylene having a bend elastic factor which is 7000–32000 kgf/cm$^2$.

11. A vehicle upholstery member mounted on an indoor side of a vehicle door, comprising:

an outer shell attached to said indoor side of said vehicle door, said outer shell extending into said vehicle;

a shock absorber disposed in at least one part of said outer shell, said shock absorber having a plurality of ribs which are substantially orthogonal to said vehicle door and which form a plurality of substantially rectangular lattices;

wherein, a value resulting from dividing a product of two sides of each of said lattices by a thickness of said ribs is set to 750–3600 mm and when said ribs are destroyed by compression with a compression speed of 50 mm/min, a stress produced at 50% deformation of said ribs is set to 3–10 kgf/cm$^2$.

12. A vehicle upholstery member, comprising:

an outer shell attached to an indoor side of a vehicle door, said outer shell extending into said vehicle; and a lattice-shaped rib structure having rib pieces extending along a vehicle width direction and a vehicle length direction such that said rib pieces cross each other appropriately to form lattice cells, wherein said rib structure is placed at least at a place corresponding to passenger hips in a space sandwiched between said outer shell and said vehicle door, wherein a lateral width and a longitudinal width of each of said lattice cells making up said rib structure are set to 20–180 mm, a thickness of each of the rib pieces is set to 0.5–3 mm, a product of the lateral width and the longitudinal width is set to 600–10800 mm$^2$, and a stress produced at 50% deformation in a vehicle width direction of the rib structure caused by a compression force along the vehicle width direction of the rib structure is set to 3–10 kgf/cm$^2$.

13. A vehicle upholstery member mounted on an indoor side of a vehicle door to form a door panel, door trim, pillar garnish, armrest or knee bolster, comprising:

an outer shell attached to said indoor side of said vehicle door, said outer shell extending into said vehicle;

a shock absorber disposed in at least one part of said outer shell, said shock absorber having a plurality of ribs which are substantially orthogonal to said vehicle door and which form a plurality of substantially rectangular lattices;

wherein each of said lattices has two sides each of which is 20–180 mm in length, and each of said ribs is 0.5–3 mm in thickness.

14. A vehicle upholstery member mounted on an indoor side of a vehicle door, comprising:

an outer shell attached to said indoor side of said vehicle door, said outer shell extending into said vehicle;

a shock absorber disposed on in at least one part of said outer shell, said shock absorber having a plurality of ribs which are substantially orthogonal to said vehicle door and which form a plurality of substantially rectangular lattices;

wherein each of said lattices has two sides each of which is 20–180 mm in length, and each of said ribs is 0.5–3 mm in thickness; and wherein said shock absorber and said outer shell are integrally formed by injection molding.

* * * * *